(12) United States Patent
Dar et al.

(10) Patent No.: US 12,197,729 B2
(45) Date of Patent: Jan. 14, 2025

(54) SYSTEM AND METHOD FOR INPUT/OUTPUT (IO) REQUEST STREAM SAMPLING FOR MACHINE LEARNING-BASED OPTIMIZATIONS IN STORAGE SYSTEMS

(71) Applicant: Dell Products L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/310,660

(22) Filed: May 2, 2023

(65) Prior Publication Data

US 2024/0370166 A1    Nov. 7, 2024

(51) Int. Cl.
*G06F 3/06* (2006.01)
*G06N 20/00* (2019.01)

(52) U.S. Cl.
CPC .......... *G06F 3/061* (2013.01); *G06F 3/0659* (2013.01); *G06F 3/0689* (2013.01); *G06N 20/00* (2019.01)

(58) Field of Classification Search
None
See application file for complete search history.

(56) References Cited

U.S. PATENT DOCUMENTS

| 7,647,131 | B1* | 1/2010 | Sadowski | G05B 23/0297 |
| | | | | 702/181 |
| 2017/0090775 | A1* | 3/2017 | Kowles | G06F 3/0608 |
| 2020/0250522 | A1* | 8/2020 | Meiri | G06N 3/08 |
| 2021/0200454 | A1* | 7/2021 | Kim | G06F 3/0631 |
| 2022/0391137 | A1* | 12/2022 | Dar | G06F 3/0635 |
| 2023/0376202 | A1* | 11/2023 | Wang | G06F 3/0673 |

* cited by examiner

*Primary Examiner* — Nathan Sadler
(74) *Attorney, Agent, or Firm* — Brian J. Colandreo; Heath M. Sargeant; Holland & Knight LLP

(57) ABSTRACT

A method, computer program product, and computing system for processing a plurality of input/output (IO) requests for a storage object of a storage system. A sampling interval may be determined for the plurality of IO requests for the storage object based upon, at least in part, a machine learning model processing the plurality of IO requests. The plurality of IO requests may be sampled using the determined sampling interval. The plurality of sampled IO requests may be processed using the machine learning model.

18 Claims, 11 Drawing Sheets

SYSTEM AND METHOD FOR INPUT/OUTPUT (IO) REQUEST STREAM SAMPLING FOR MACHINE LEARNING-BASED OPTIMIZATIONS IN STORAGE SYSTEMS

BACKGROUND

The ability to model and characterize the input/output (IO) request activity of objects such as files, volumes, or extents, in a storage system, can enable significant performance gains. For example, it can enable better tiering and caching in a storage system, assist in load balancing across a storage cluster, or help guide data placement and movement in a cloud or combined on-premises and cloud environment. It can also be leveraged to detect security threats such as a ransomware attack.

However, in a storage system comprising millions of storage objects, the cost of generating features and building a model (i.e., training) can be prohibitive, in terms of the memory footprint and CPU overhead when sampling each IO request.

SUMMARY OF DISCLOSURE

In one example implementation, a computer-implemented method executed on a computing device may include, but is not limited to, processing a plurality of input/output (IO) requests for a storage object of a storage system. A sampling interval may be determined for the plurality of IO requests for the storage object based upon, at least in part, a machine learning model processing the plurality of IO requests. The plurality of IO requests may be sampled using the determined sampling interval. The plurality of sampled IO requests may be processed using a machine learning model.

One or more of the following example features may be included. The sampling interval may include a sampling interval duration. The sampling interval may include a sampling interval frequency. Determining the sampling interval may include determining a plurality of target IO features associated with the machine learning model, and determining a sampling interval associated with the plurality of target IO features. Determining the sampling interval may include comparing IO feature similarity from a first sampling interval and at least a second sampling interval. Determining the sampling interval may include comparing machine learning model performance between a first sampling interval and at least a second sampling interval. Processing the plurality of sampled IO requests using a machine learning model may include generating a plurality of IO features using the plurality of sampled IO requests. The plurality of IO features include one or more of: a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; and a standard deviation in write IO request length. A temperature value for the storage object may be forecast using the machine learning model and the plurality of sampled IO requests.

In another example implementation, a computer program product resides on a computer readable medium that has a plurality of instructions stored on it. When executed by a processor, the instructions cause the processor to perform operations that may include, but are not limited to, processing a plurality of input/output (IO) requests for a storage object of a storage system. A sampling interval may be determined for the plurality of IO requests for the storage object based upon, at least in part, a machine learning model processing the plurality of IO requests. The plurality of IO requests may be sampled using the determined sampling interval. The plurality of sampled IO requests may be processed using a machine learning model.

One or more of the following example features may be included. The sampling interval may include a sampling interval duration. The sampling interval may include a sampling interval frequency. Determining the sampling interval may include determining a plurality of target IO features associated with the machine learning model, and determining a sampling interval associated with the plurality of target IO features. Determining the sampling interval may include comparing IO feature similarity from a first sampling interval and at least a second sampling interval. Determining the sampling interval may include comparing machine learning model performance between a first sampling interval and at least a second sampling interval. Processing the plurality of sampled IO requests using a machine learning model may include generating a plurality of IO features using the plurality of sampled IO requests. The plurality of IO features include one or more of: a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; and a standard deviation in write IO request length. A temperature value for the storage object may be forecast using the machine learning model and the plurality of sampled IO requests.

In another example implementation, a computing system includes at least one processor and at least one memory architecture coupled with the at least one processor, wherein the at least one processor is configured to process a plurality of input/output (IO) requests for a storage object of a storage system. A sampling interval may be determined for the plurality of IO requests for the storage object based upon, at least in part, a machine learning model processing the plurality of IO requests. The plurality of IO requests may be sampled using the determined sampling interval. The plurality of sampled IO requests may be processed using a machine learning model.

One or more of the following example features may be included. The sampling interval may include a sampling interval duration. The sampling interval may include a sampling interval frequency. Determining the sampling interval may include determining a plurality of target IO features associated with the machine learning model, and determining a sampling interval associated with the plurality of target IO features. Determining the sampling interval may include comparing IO feature similarity from a first sampling interval and at least a second sampling interval. Determining the sampling interval may include comparing machine learning model performance between a first sampling interval and at least a second sampling interval. Processing the plurality of sampled IO requests using a machine learning model may include generating a plurality of IO features using the plurality of sampled IO requests. The plurality of IO features include one or more of: a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; and a standard deviation in write IO request length. A temperature value for the storage object may be forecast using the machine learning model and the plurality of sampled IO requests.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
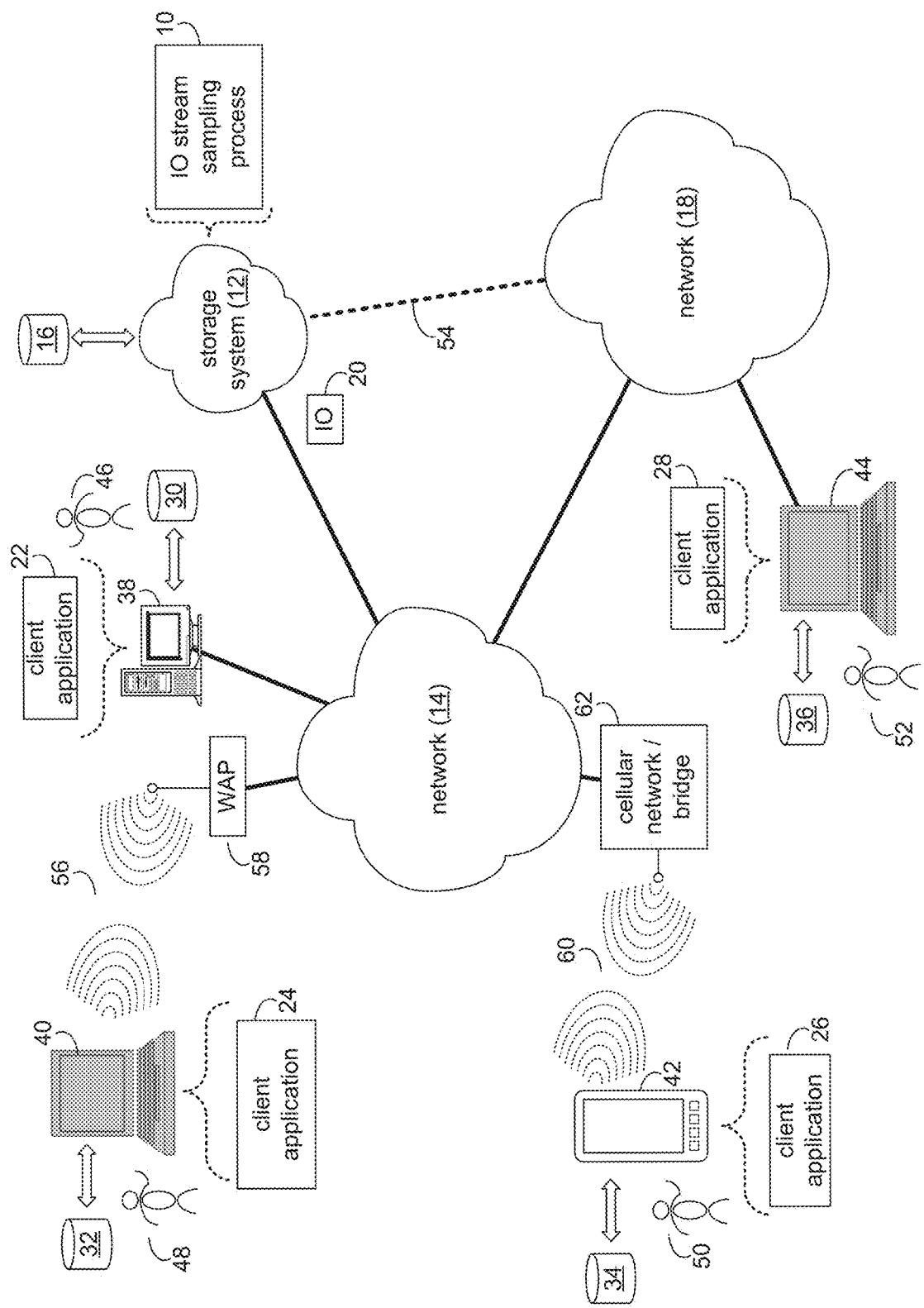
FIG. 1 is an example diagrammatic view of a storage system and an IO stream sampling process coupled to a distributed computing network according to one or more example implementations of the disclosure.

System Overview:

Referring to FIG. 1, there is shown IO stream sampling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of IO stream sampling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of IO stream sampling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a IO stream sampling process, such as IO stream sampling process 10 of FIG. 1, may include but is not limited to, processing a plurality of input/output (IO) requests for a storage object of a storage system. A sampling interval may be determined for the plurality of IO requests for the storage object based upon, at least in part, a machine learning model processing the plurality of IO requests. The plurality of IO requests may be sampled using the determined sampling interval. The plurality of sampled IO requests may be processed using the machine learning model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
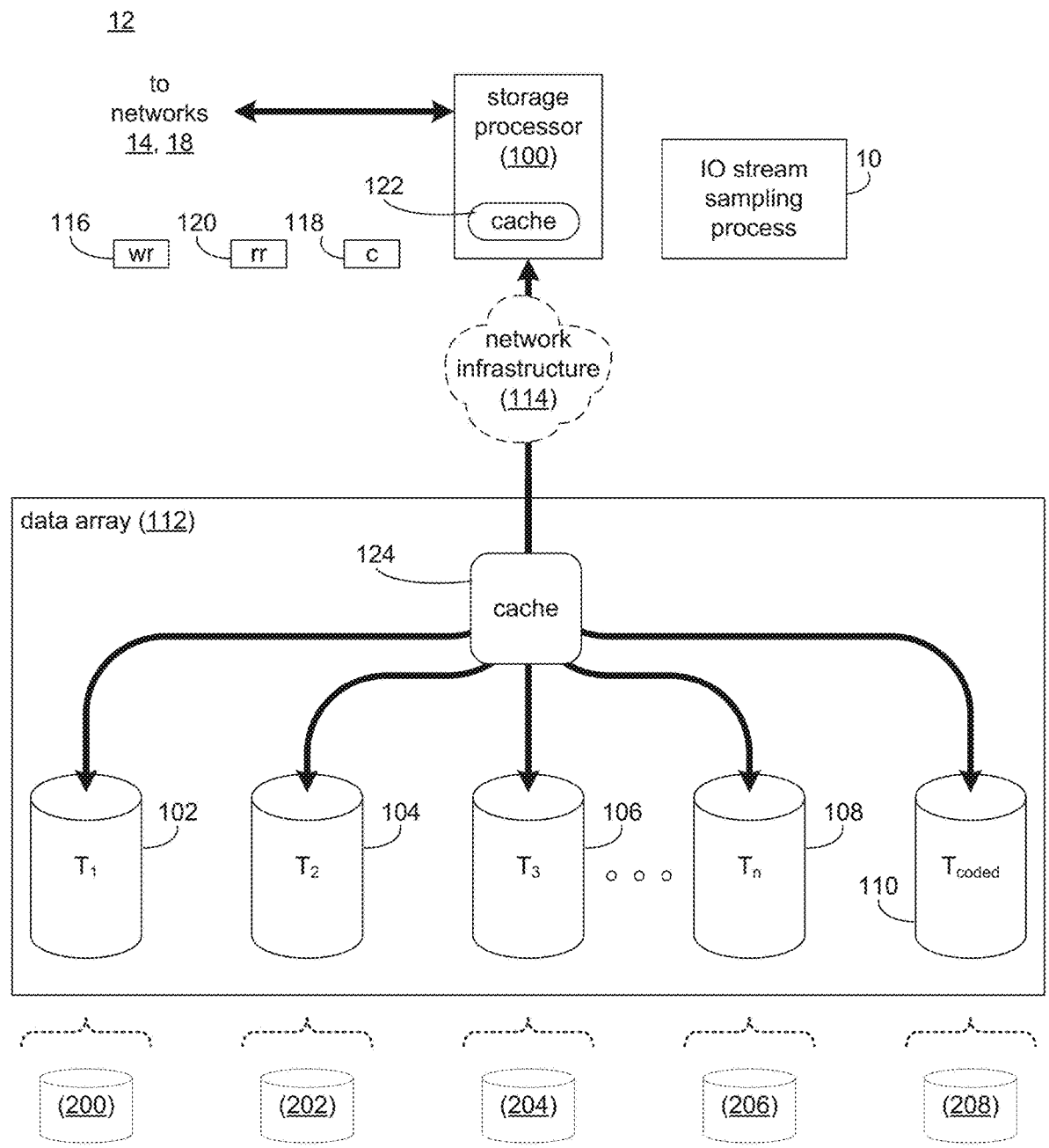
FIG. 2 is an example diagrammatic view of the storage system of FIG. 1 according to one or more example implementations of the disclosure.
Figure 3:
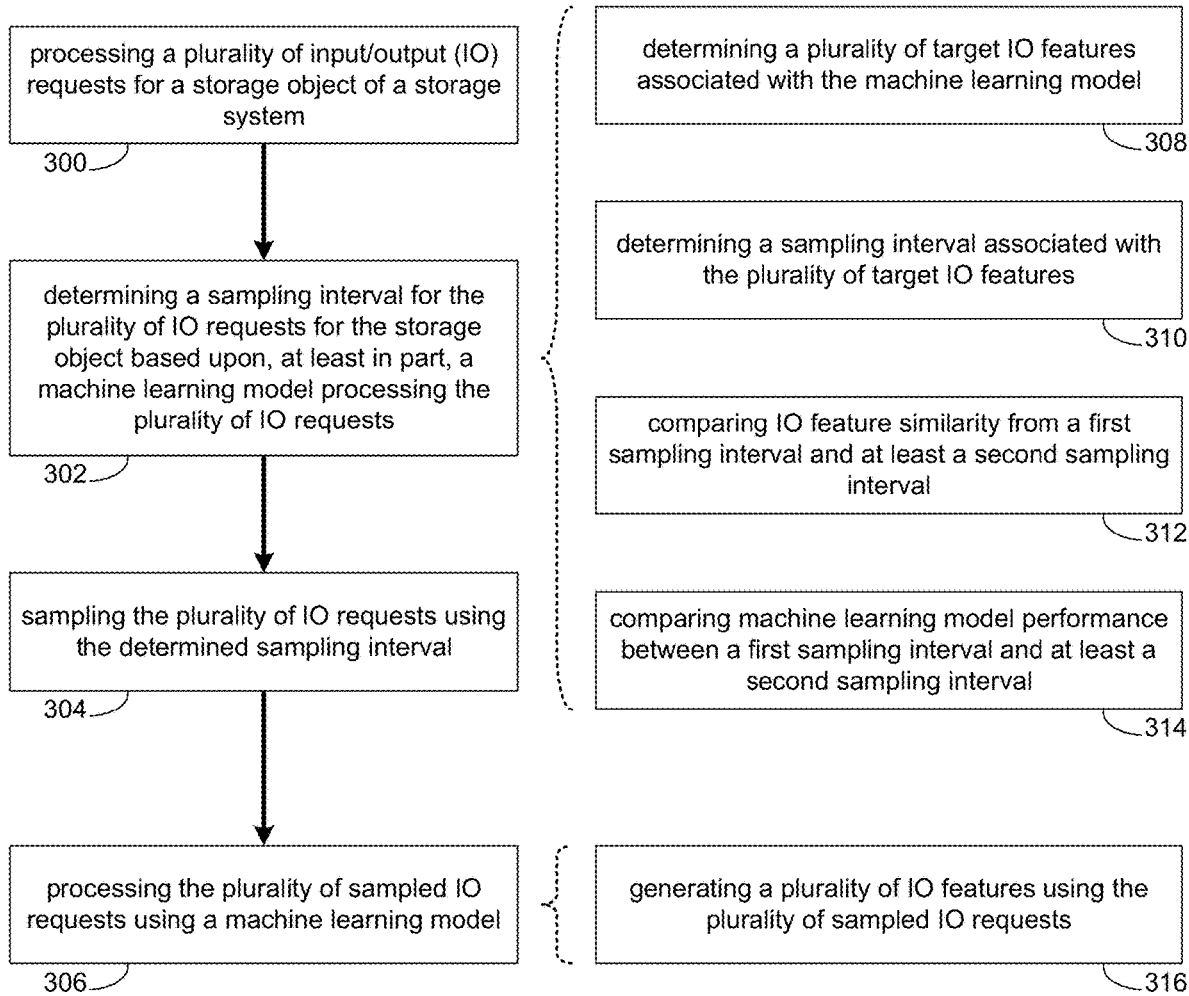
FIG. 3 is an example flowchart of IO stream sampling process according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of IO stream sampling process 10. The instruction sets and subroutines of IO stream sampling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of IO stream sampling process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of IO stream sampling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of IO stream sampling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The IO Stream Sampling Process:

Referring also to the examples of FIGS. 3-11 and in some implementations, IO stream sampling process 10 may process 300 a plurality of input/output (IO) requests for a storage object of a storage system. A sampling interval may be determined 302 for the plurality of IO requests for the storage object based upon, at least in part, a machine learning model processing the plurality of IO requests. The plurality of IO requests may be sampled 304 using the determined sampling interval. The plurality of sampled IO requests may be processed 306 using the machine learning model.

As will be discussed in greater detail below, implementations of the present disclosure may allow for cost-effective IO stream sampling with features that capture relationships between IO requests that provide the most accurate machine learning modeling. For example, IO stream sampling process 10 includes intelligent IO features that capture not only properties of individual IO requests and general statistics of the entire sequence, such as the average IO size and ratio of read IO requests to write IO requests, but also relationships between successive IO requests, such as the time and space difference between consecutive IO requests (including specifically for read IO requests and write IO requests), identification of sequential IO requests (read IO requests or write IO requests), read IO requests followed by write IO requests on the exact same address range ("overwrite"), etc. The ability to model and characterize the input/output (IO) request activity of objects such as files, volumes, or extents, in a storage system, can enable significant performance gains. For example, it can enable better tiering and caching in a storage system, assist in load balancing across a storage cluster, or help guide data placement and movement in a cloud or combined on-premises and cloud environment. It can also be leveraged to detect security threats such as a ransomware attack.

However, in a storage system comprising millions of storage objects, the cost of generating features and building a model (i.e., training) can be prohibitive, in terms of the memory footprint and CPU overhead when sampling each IO request. Accordingly, implementations of the present disclosure allow for IO stream sampling that reduces this computational cost, while still capturing the features and relationships between IO requests that provide the most accurate machine learning modeling. As will be discussed in greater detail below, IO stream sampling process 10 may provide interval sampling (i.e., sampling a plurality of consecutive IO requests at some frequency) as an enhancement over traditional point sampling (i.e., sampling a single IO request at some frequency) when processing IO requests. For example, traditional point sampling fails to capture the important relationships between IO requests, and as a result, the features generated with point sampling have a much lower contribution to the accuracy of the machine learning model.

In some implementations, IO stream sampling process 10 may process 300 a plurality of input/output (IO) requests for a storage object of a storage system. For example and referring again to FIG. 2, during the operation of a storage system (e.g., storage system 12), IO requests may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g., by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Figure 4:
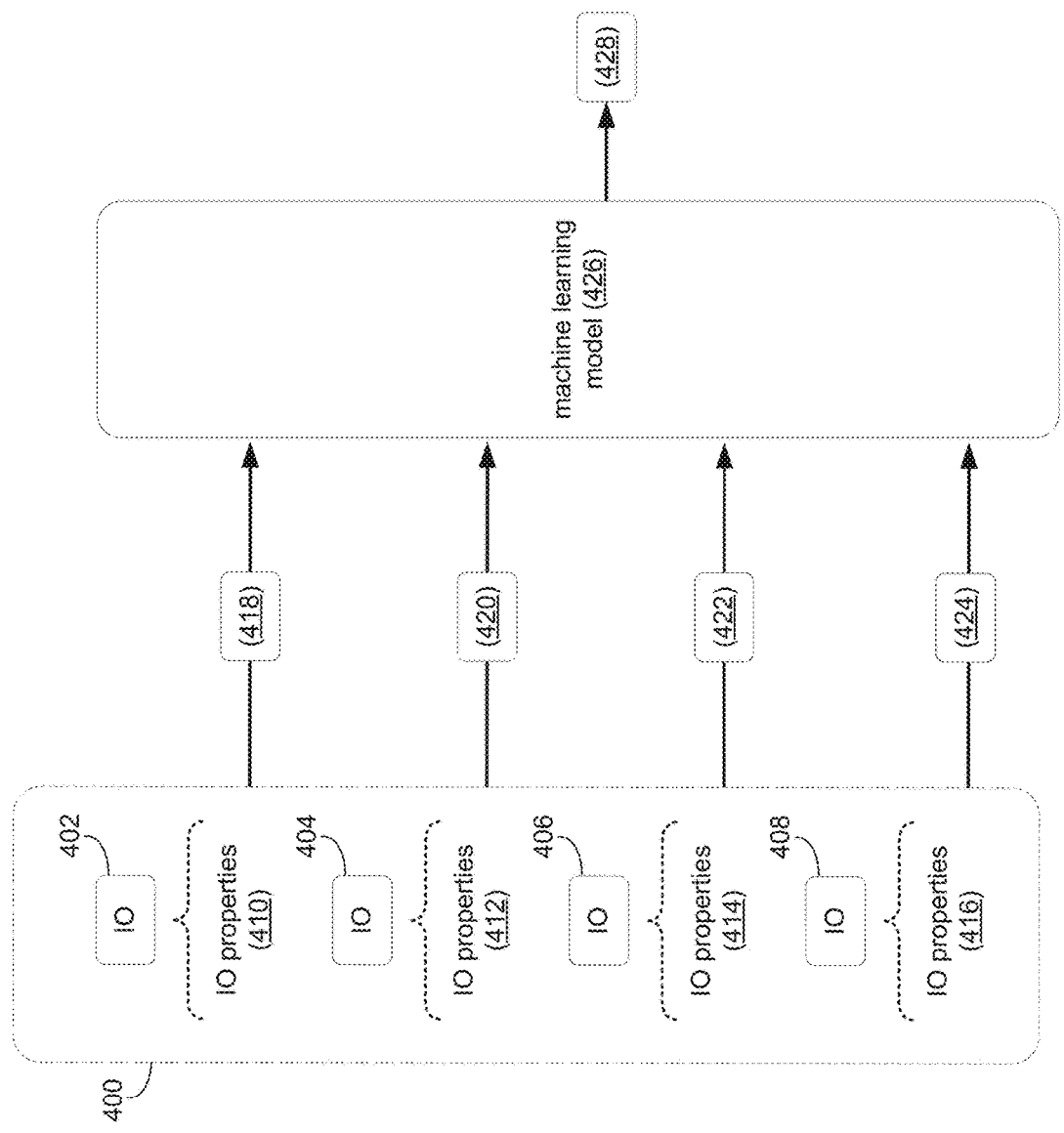
FIGS. 4-5 are example diagrammatic views of the IO stream sampling process according to various example implementations of the disclosure.

Referring also to FIG. 4, a plurality of IO requests (e.g., plurality of IO requests 400) may include e.g., IO requests associated with various storage objects and/or the same storage object. IO request 402 may represent any number of IO requests to perform a read IO request on a first storage object (e.g., storage object 200); IO request 404 may represent any number of IO requests to perform a write IO request on storage object 200; IO request 406 may represent any number of IO requests to perform a read IO request on storage object 200; and IO request 408 may represent any number of IO requests to perform an operation on storage object 200. While four separate IO requests for a single storage object have been described, it will be appreciated that this is for example purposes only and that any number of IO requests may be received for any number of storage objects within the present disclosure.

In some implementations, IO stream sampling process 10 may determine 302 a sampling interval for the plurality of IO requests for the storage object based upon, at least in part, a machine learning model processing the plurality of IO requests. A sampling interval is a number of IO requests sampled or aggregated for processing by a machine learning model (e.g., machine learning model 426). For example, as time-stamped IO requests are processed from a workload running on a host to a storage device, a stream of IO requests directed towards the same storage object may be processed as a sequence ordered by time. In some implementations, the sampling interval may include a "sampling selectivity" (i.e., the ratio between the number of data points that are sampled and the total number of points in the sequence). As will be discussed in greater detail below, IO stream sampling process 10 may determine 302 the sampling interval as a user-defined value (e.g., provided using a user interface), a default value, and/or a dynamically determined for adjusted value.

In some implementations, IO stream sampling process 10 may determine a number of sequential IO requests over time to determine a sampling interval. For example, depending upon the number of IO requests received for a particular storage object within a certain period of time, IO stream sampling process 10 may determine a sampling interval for the storage object. For example, IO stream sampling process 10 may include various sampling intervals that define a threshold number of IO requests for a threshold time duration. In one example, if the number of IO requests exceeds a first number of IO requests in a first threshold time duration, IO stream sampling process 10 may use a first sampling interval. In another example, if the number of IO requests exceeds a second number of IO requests in a first threshold time duration, IO stream sampling process 10 may use a second sampling interval. Accordingly, it will be appreciated that various thresholds (e.g., in terms of numbers of IO requests and/or time durations) may be used to determine a sampling interval for the storage object.

In some implementations, the sampling interval includes a sampling interval duration. A sampling interval duration is a number of sequential IO requests to sample from for each sampling interval. For example and referring also to FIG. 5, IO stream sampling process 10 may IO stream sampling process 10 a plurality of IO requests (e.g., IO requests 500) where each individual rectangle represents an individual IO request being processed for a particular storage object. In another example, IO stream sampling process 10 may determine 302 a sampling interval (e.g., as shown in plurality of IO requests 502) with a sampling interval duration of one IO request. In another example, IO stream sampling process 10 may determine a sampling interval of one IO request with a different sampling interval frequency (e.g., as shown in plurality of IO requests 504 and as will be discussed in greater detail below). In some implementations, the sampling interval as shown in the plurality of IO requests 502 and plurality of IO requests 504 may represent point sampling where a single IO request is processed at some interval (e.g., 50% in the example of plurality of IO requests 502 and 25% in the example of plurality of IO requests 504). Point sampling may fail to account for relationships between consecutive IO requests. Accordingly, IO stream sampling process 10 may determine a sampling interval that captures these relationships.

For example, the sampling interval duration may include at least two IO requests. That is, at least two consecutive IO requests. In some implementations, the sampling interval duration includes at least a threshold number of IO requests greater than two. As discussed above, the relationship between sequential IO requests may be used by a machine learning model to model the behavior of a storage object. For example, when processing IO requests for a storage object, more sequential IO requests over a shorter period of time may indicate a likelihood that a storage object is more active while a gap between IO requests may indicate that a storage object is less active. As such, it will be appreciated that when processing IO requests, a sampling interval duration captures important information about the activity of a storage object.

Figure 5:
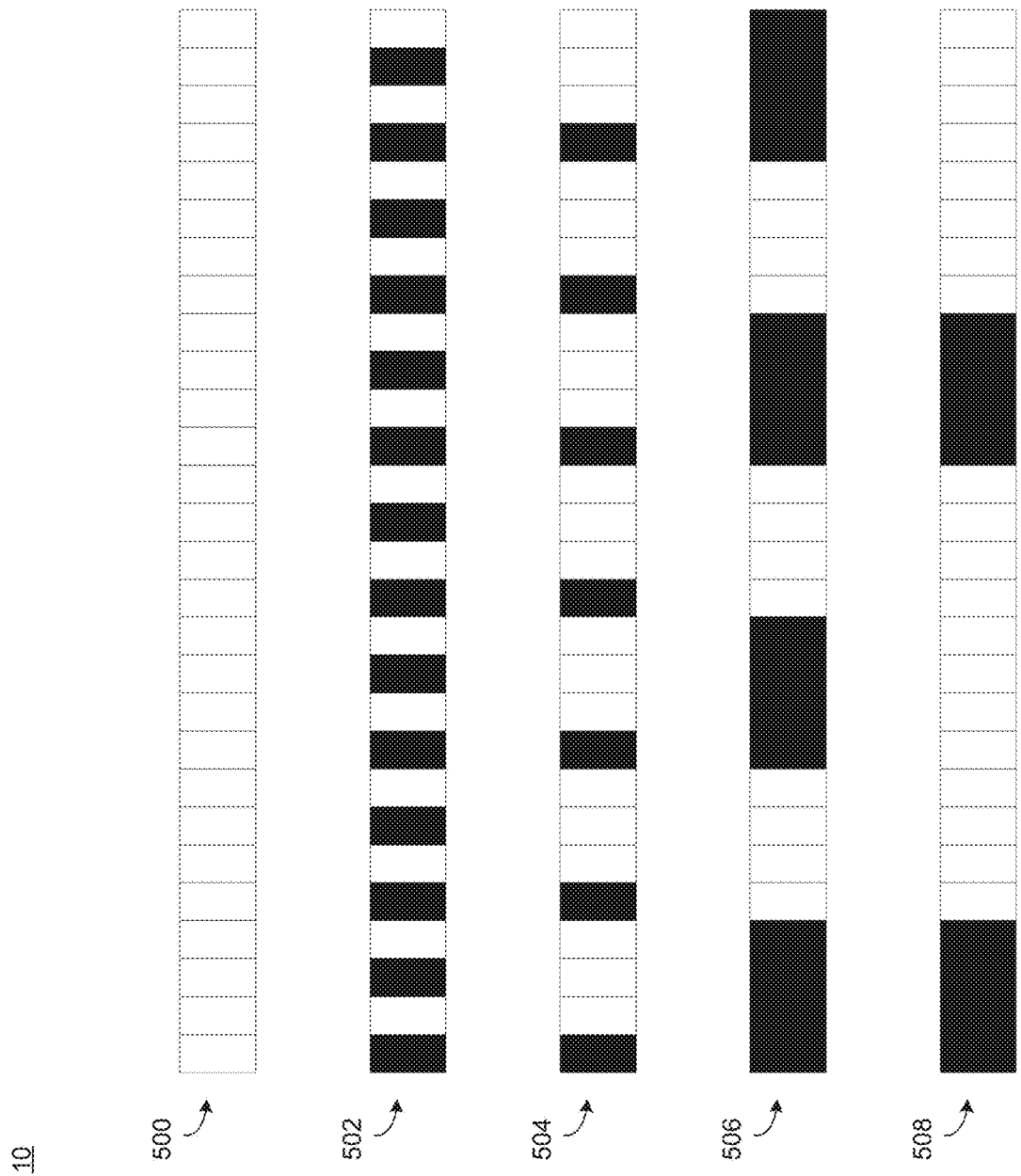

In another example and as shown in FIG. 5, the sampling interval duration for plurality of IO requests 506 may be e.g., four IO requests. Additionally, the sampling interval duration for plurality of IO requests 508 may be four IO requests but with a different sampling interval frequency. While examples of one and four IO requests have been provided for the sampling interval duration, it will be appreciated that these are for example purposes only and that the sampling interval duration may include any number of IO requests within the scope of the present disclosure. In some implementations, the sampling interval duration may be user-defined (e.g., using a user interface), may be a default value, and/or may be determined by IO stream sampling process 10. As will be discussed in greater detail below, the sampling interval duration may be determined dynamically.

In some implementations, the sampling interval includes a sampling interval frequency. A sampling interval frequency is the number or percentage of sequential IO requests to sample from for each sampling interval from a total number of IO requests. For example, IO stream sampling process 10 may determine 302 a sampling interval (e.g., as shown in plurality of IO requests 502) with a sampling interval frequency of 50% (e.g., every other IO request is sampled). In another example, IO stream sampling process 10 may determine a sampling interval frequency of 50% with a different sampling interval duration (e.g., as shown in plurality of IO requests 506 with a sampling interval duration of four IO requests). In yet another example, IO stream sampling process 10 may determine 302 a sampling interval frequency of 25% as shown in plurality of IO requests 504 and plurality of IO requests 508. While examples of 25% and 50% sampling interval frequencies have been provided, it will be appreciated that these are for example purposes only and that any sampling interval frequency may be used within the scope of the present disclosure.

As shown in FIG. 5, various sampling intervals may be used for particular machine learning models. Accordingly, stream sampling process 10 determines 302 a sampling interval for the plurality of IO requests for the storage object based upon, at least in part, a machine learning model processing the plurality of IO requests. In this manner, stream sampling process 10 can optimize interval-based sampling for particular machine learning models or particular applications of machine learning models. For example, suppose a machine learning model is configured to identify ransomware attacks on a storage system. Suppose that a training dataset includes 674 ransomware samples and 3,361 benign samples and that a test dataset has 169 ransomware samples and 840 benign samples. In this example, the machine learning model is trained on the entire training dataset in order to obtain the best model. The machine learning model performance is tested for both binary classification (ransomware vs. benign) and multi-class classification (a number of ransomware variant classes and a benign class) for subsets of the test dataset obtained using various sampling methods and intervals.

TABLE 1

| | No Sampling | 20 seconds (20 s) 50% sampling | 10 s 50% sampling | 1 s 50% Sampling | Point Sampling |
|---|---|---|---|---|---|
| Binary Classification | 99.5% | 97% | 96% | 96% | 70% |
| Multi-Class Classification | 99% | 92% | 91% | 88% | 70% |

As shown in Table 1, the machine learning model accuracy (i.e., percentage of test samples classified correctly) is determined for different sampling methods with a 50% sampling interval frequency, relative to the accuracy obtained using the entire test dataset without sampling. In this example, the best results are obtained with a twenty second sampling interval, and the model accuracy diminishes as the sampling interval is lowered. With point sampling the model accuracy was only e.g., 70%.

In some implementations, determining 302 the sampling interval includes: determining 308 a plurality of target IO features associated with the machine learning model; and determining 310 a sampling interval associated with the plurality of target IO features. As shown below in Table 2, suppose a machine learning model is configured for multi-class classification focusing on ransomware classes. Table 2 includes precision (i.e., the ratio of true positive classifications to total predicted positive classifications), recall (i.e., the ratio of true positive classifications to total actual positive classifications), and F1 scores (i.e., a function based on precision and recall) for a multi-class machine learning model. From Table 2, the recall for point sampling in this example is zero, (i.e., the machine learning model fails to detect any of the ransomware samples, and simply classifies all the test samples as benign). With interval sampling, the machine learning model performance (i.e., both precision and recall) improves as the sample length increases from one second to ten seconds to twenty seconds. In this example, the ransomware samples are up to two minutes, and thus, the maximum interval length that can be effectively tested is twenty seconds. However, it will be appreciated that with greater variety in the ransomware or other training data samples, additional sampling intervals can be tested within the scope of the present disclosure.

TABLE 2

| | | Sample Types | | | |
|---|---|---|---|---|---|
| | | 20 Seconds | 10 Seconds | 1 Second | Point |
| Multiclass | Precision | 72% | 67% | 53% | 0% |
| | Recall | 51% | 46% | 30% | 0% |
| | F1 | 58% | 54% | 34% | 0% |

Figure 6:
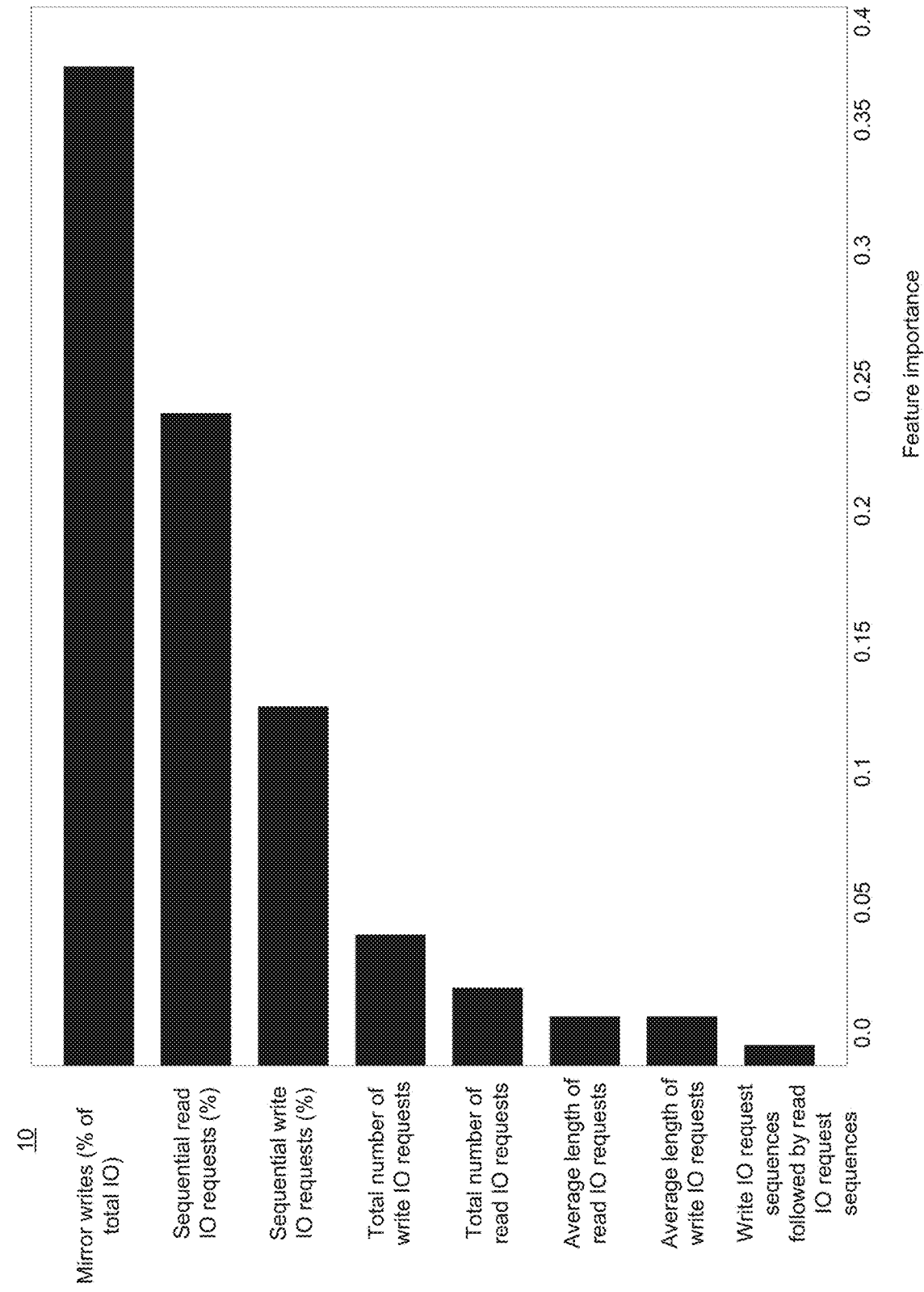
FIG. 6 is an example graph depicting feature importance according to one or more example implementations of the disclosure.
Figure 7:
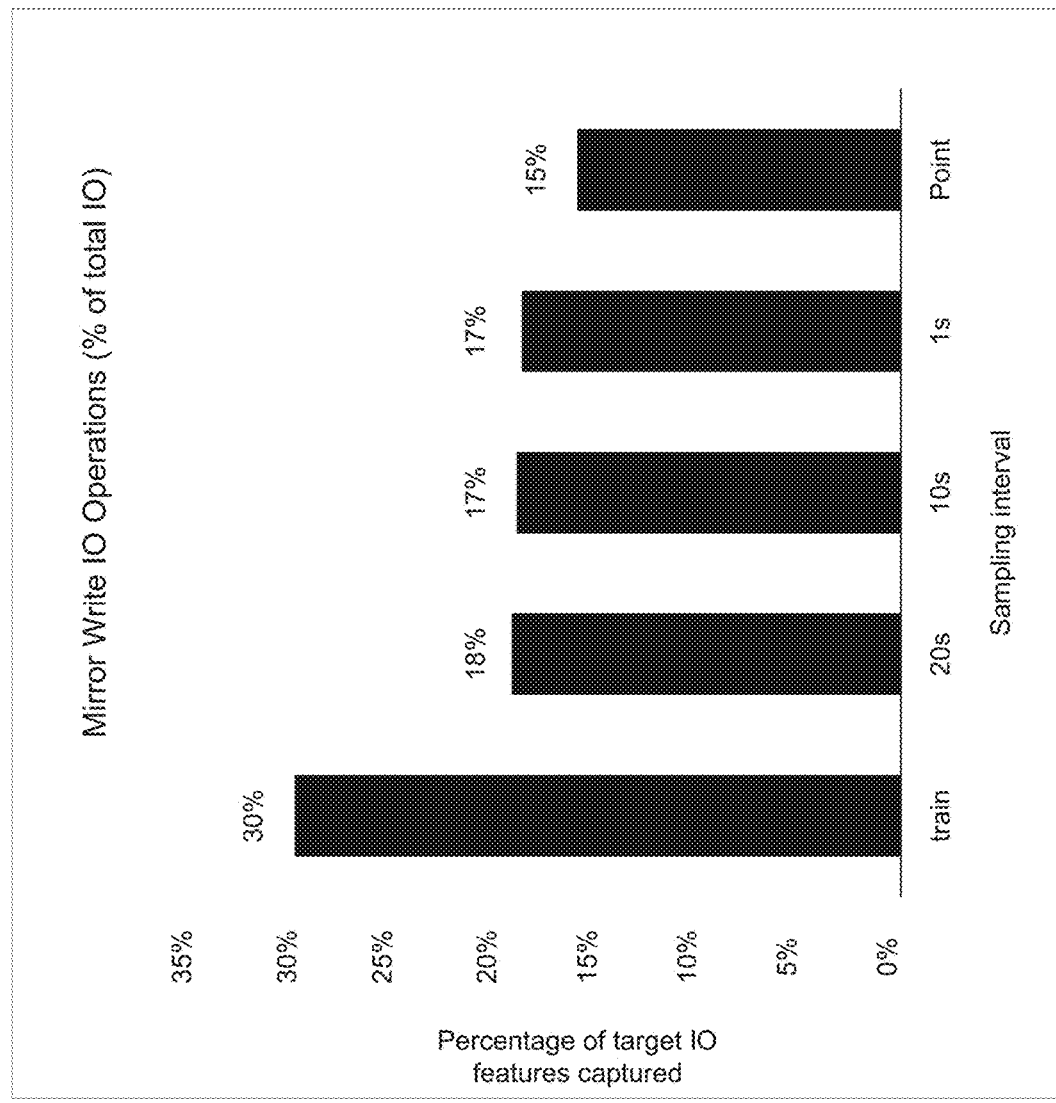
FIGS. 7-9 are example graphs depicting percentage of target IO features captured according to various example implementations of the disclosure.
Figure 8:
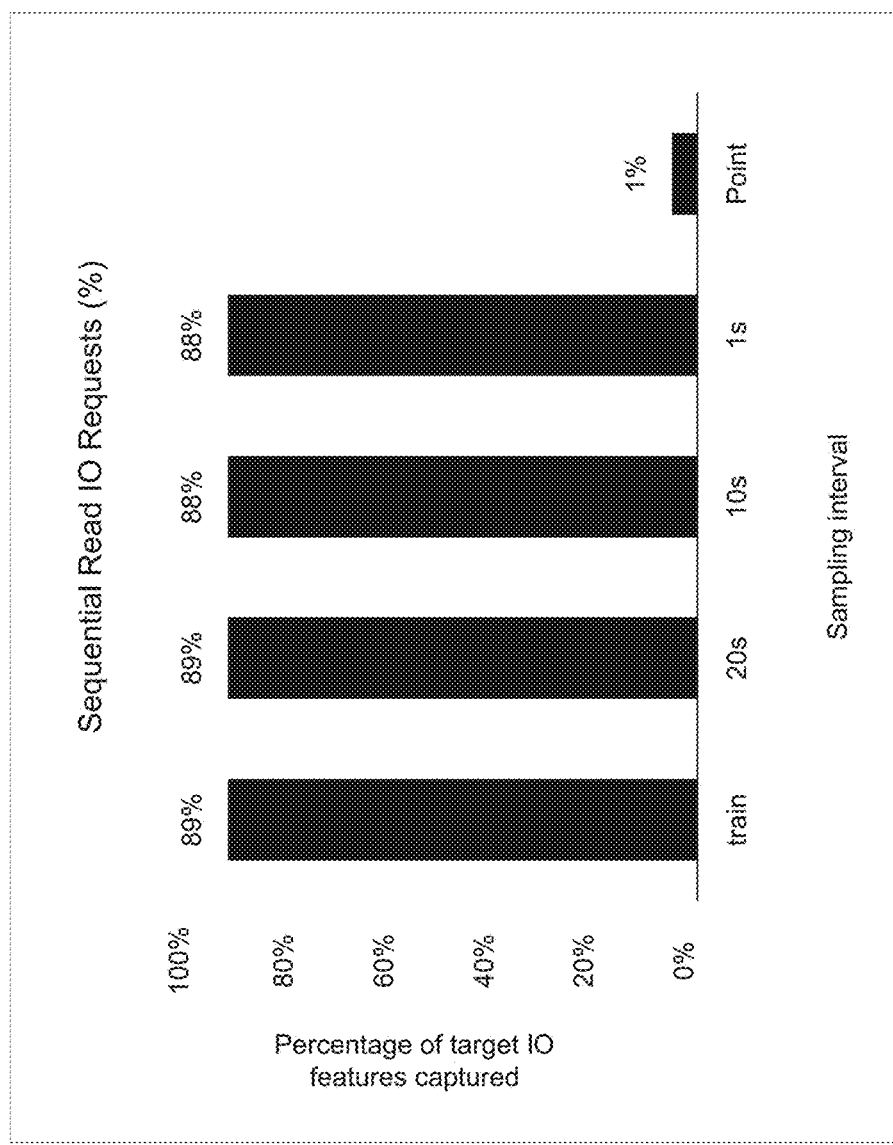
Figure 9:
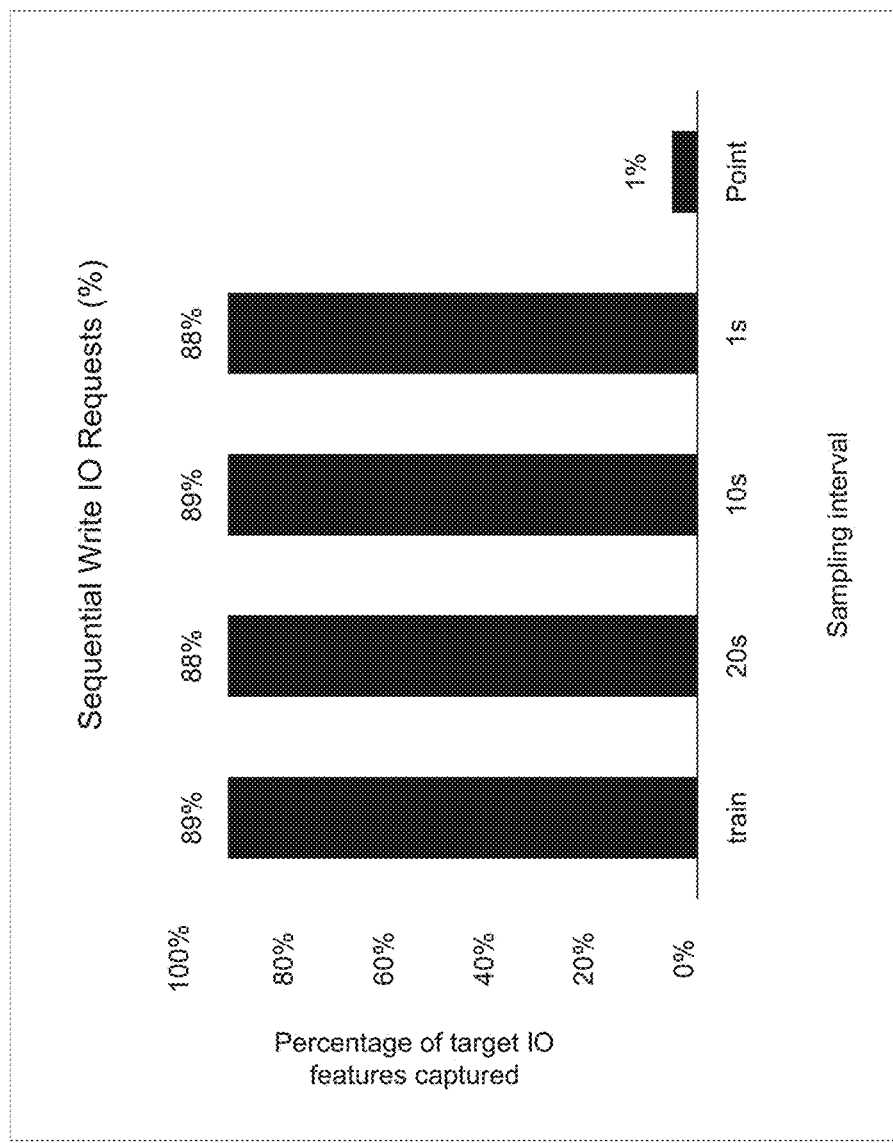

In some implementations, stream sampling process 10 determines 308 a plurality of target IO features associated with the machine learning model. Referring also to FIG. 6, the top features for the example ransomware classification model of Table 2 are shown. As shown in FIG. 6, the most important feature in terms of classification performance is the mirror writes, followed by sequential reads, and sequential writes. Determining 308 the plurality of target IO features for a particular machine learning model may include identifying a plurality of IO features associated with correct classifications by the machine learning model. In this manner, a plurality of target IO features are the IO features that are most effective in the correct classification by the machine learning model. For example, the plurality of target IO features may include a threshold number of IO features or IO features with a threshold amount of feature importance. Feature importance is a score or metric of classification performance (i.e., features that contribute or influence correct classification performance have higher values).

As shown in FIG. 6, the IO feature, mirror write IO requests, has the highest feature importance score (e.g., approximately 0.4) while the sequential read IO requests have a feature importance score of approximately 0.25 and the sequential write IO requests have a feature importance score of approximately 0.14. In some implementations, the plurality of target IO features are associated with a type of machine learning model and/or a classification task for a machine learning model. For example, stream sampling process 10 may access a database or other datastore with a predefined list of target IO features for particular machine learning models and/or for specific classification tasks for machine learning models. In this manner, stream sampling process 10 determines 308 the plurality of target IO features by comparing the machine learning model and/or the classification task for the machine learning model against a plurality of machine learning models or classification tasks for machine learning models to identify a predefined list of target IO features.

Figure 10:
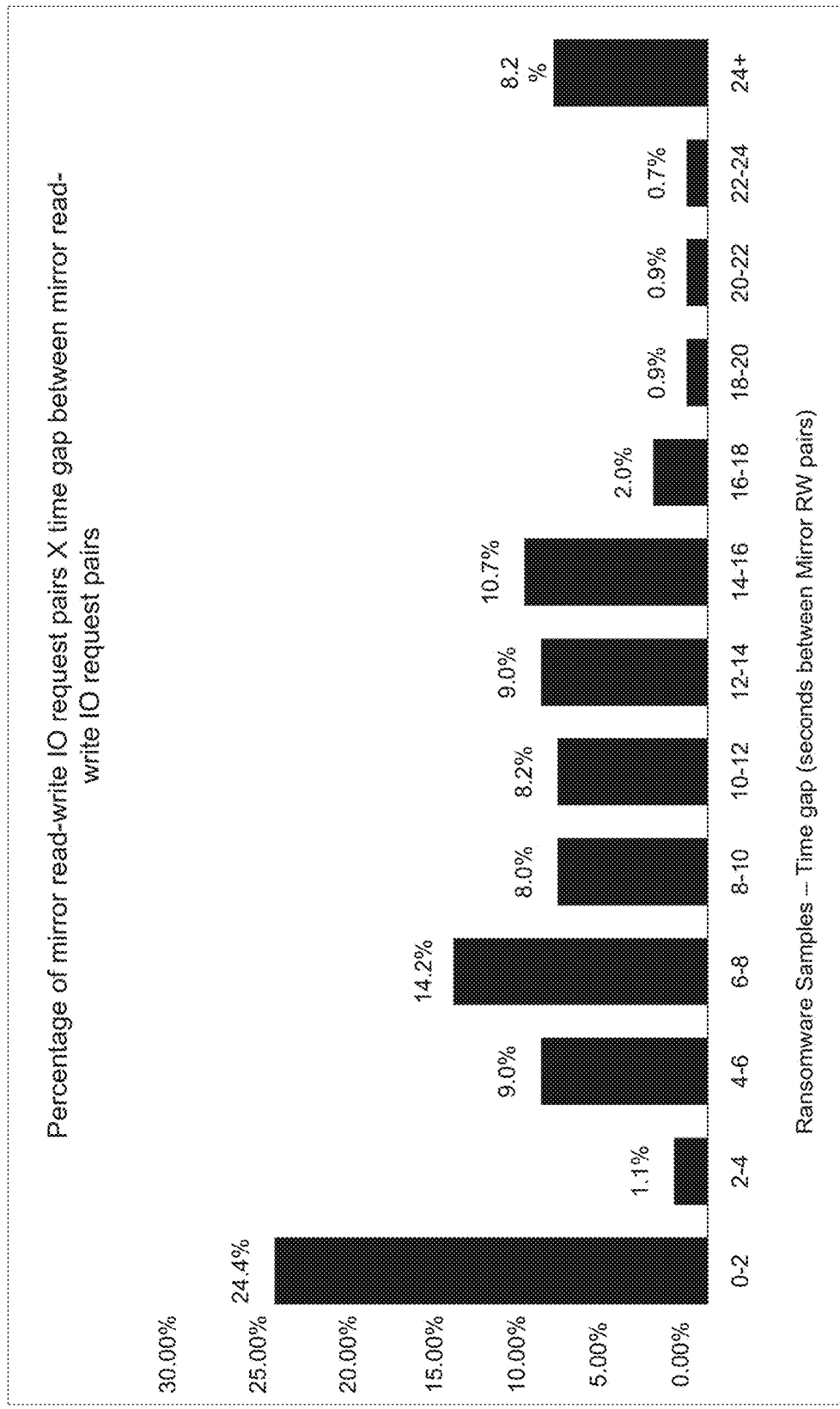
FIGS. 10-11 are example graphs depicting time gaps between particular target IO features according to various example implementations of the disclosure.
Figure 11:
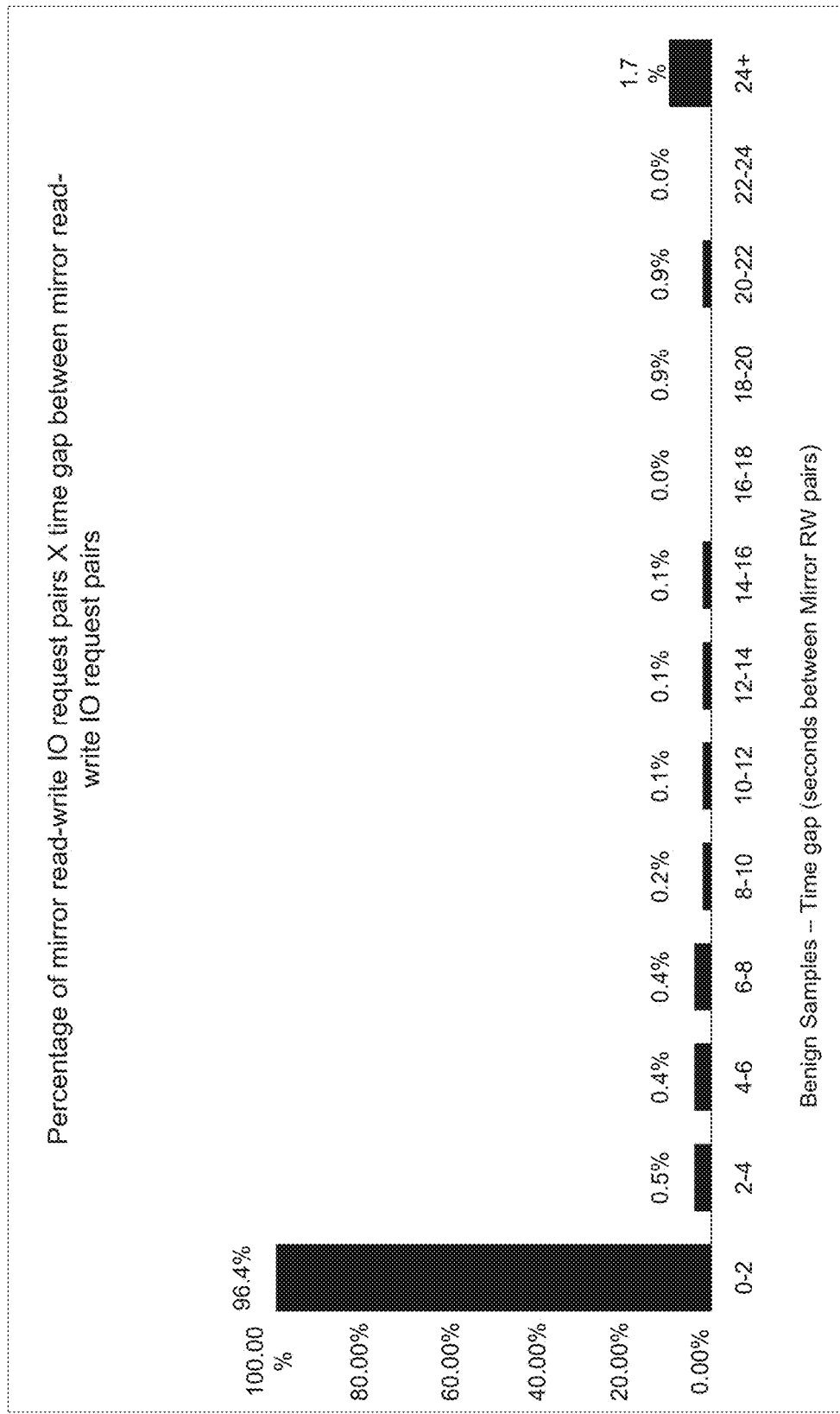

In some implementations, determining 310 a sampling interval associated with the plurality of target IO features includes determining an amount of time required for the plurality of target IO features to manifest for the machine learning model. For example and referring also to FIGS. 7-9, the percentage of target IO features captured during particular sampling intervals (e.g., twenty seconds, ten seconds, one second, and point sampling) is shown for mirror write (e.g., FIG. 7), sequential read IO requests (e.g., FIG. 8), and sequential write IO requests (e.g., FIG. 9). In these figures, focusing on an exemplary ransomware dataset, it is observed that point sampling misses almost all of the sequential read IO requests and sequential write IO requests, and captures fewer mirror write IO requests than interval sampling. Accordingly, stream sampling process 10 determines 310 a sampling interval associated with the plurality of target IO features by determining the time duration required to capture the target IO feature values. Referring also to FIGS. 10-11, the distribution of the time gap between the initial read IO request and the ensuing write IO request, in FIG. 10 for the ransomware class, and for completeness in FIG. 11 for the benign class. From this example of the ransomware class, the mirror read-write target IO feature takes less than twenty seconds to manifest 90% of the time, but in some cases, it takes up to thirty seconds. For the benign class, the mirror read-write target IO feature manifests much faster, but this is insignificant, as the average mirror percentage in our benign dataset is only 2.5% as opposed to 30% in the ransomware dataset. Accordingly, stream sampling process 10 determines 310 the sampling interval length to be twenty to thirty seconds. For example, stream sampling process 10 determines 310 the sampling interval associated with the plurality of target IO features by determining a sampling interval in which a threshold percentage of the target IO features are observed or manifest. In the above example, stream sampling process 10 determines the sampling interval length to be twenty to thirty seconds in order to obtain a threshold percentage of the target IO features. In some implementations, the threshold percentage of the target IO features may include a user-defined value or a default value.

In some implementations, determining 302 the sampling interval includes comparing 312 IO feature similarity from a first sampling interval and at least a second sampling interval. IO feature similarity generally includes a measure of the similarity in the weighting of a plurality of IO features across different sampling intervals or machine learning models. For example, stream sampling process 10 determines an IO feature signature for a first sampling interval (e.g., full consideration of each and every IO request) as a vector of weights of each IO feature. Stream sampling process 10 determines an IO feature signature for at least a second sampling interval (e.g., iteratively for multiple sampling intervals) as a vector of weights of each IO feature across each sampling interval. In some implementations, stream sampling process 10 compares 312 the IO feature similarity between the first sampling interval (e.g., the full model) and the at least a second sampling interval (e.g., the subsets resulting from the choice of different interval lengths). Table 3 below shows an example of comparing 312 IO feature similarities from the first sampling interval and the at least a second sampling interval using two methods—measuring similarity based on Cosine distance and Euclidian distance. In this example, the twenty second interval provides the best signature match (i.e., similarity between 0.064 and 0.068).

TABLE 3

|  | No sampling | 20 Sec | 10 Sec | 1 Sec | Point |
| --- | --- | --- | --- | --- | --- |
| Cosine Distance | 0.00017 | 0.064 | 0.08 | 0.07 | 0.23 |
| Euclidian Distance | 0.008 | 0.068 | 0.09 | 0.08 | 0.42 |
| IO feature similarity comparison | 0.00783 | 0.004 | 0.01 | 0.01 | 0.19 |

In some implementations, determining 302 the sampling interval includes comparing 314 machine learning model performance between a first sampling interval and at least a second sampling interval. Machine learning model performance is a metric or measure of the machine learning model in terms of precision, recall, F1, etc. In some implementations, stream sampling process 10 determines the performance of the machine learning model using a first sampling interval (e.g., a full model with each and every IO request) and determines the performance of the machine learning model using at least a second sampling interval (e.g., iteratively for multiple sampling intervals). For example, stream sampling process 10 compares the machine learning model performance measured with the first sampling interval (e.g., the full model) with the same metrics measured with the at least a second sampling intervals (e.g., various sampling intervals). In some implementations, stream sampling process 10 compares the full model iteratively through a plurality of sampling intervals, starting with a short interval (e.g., 5 seconds) and increasing the interval until no gain is observed in the machine learning model performance. For example, with various second sampling intervals, the machine learning model performance of the changing second sampling interval will vary compared to the machine learning model performance of the first sampling interval. Accordingly, stream sampling process 10 iterates through second sampling intervals comparing 314 the machine learning model performances until a best performing sampling interval is determined.

In some implementations, IO stream sampling process 10 may sample 304 the plurality of IO requests using the determined sampling interval. For example and as discussed above, sampling 304 the plurality of IO requests using the determined sampling interval includes processing the plurality of IO requests on the storage object while selectively processing certain IO requests using the determined sampling interval. Referring again to FIG. 5, suppose IO stream sampling process 10 determines 302 a sampling interval with a sampling interval duration of four IO requests and a sampling interval frequency of 50% as shown with plurality of IO requests 506. In this example, IO stream sampling process 10 may sample 304 the shaded rectangles representing IO requests that fall within the sampling interval. In another example, suppose IO stream sampling process 10 determines 302 a sampling interval with a sampling interval duration of four IO requests and a sampling interval frequency of 25% as shown with plurality of IO requests 508. In this example, IO stream sampling process 10 may sample 304 the shaded rectangles representing IO requests that fall within the sampling interval. While various examples of sampling intervals have been provided, it will be appreciated that any sampling interval may be used within the scope of the present disclosure.

In some implementations, IO stream sampling process 10 may process 306 the plurality of sampled IO requests using a machine learning model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. In one example, a random-forest machine learning model may be used due to its generality, simplicity, tunability, and ability to cope with over-fitting. However, it will be appreciated that various machine learning models may be used within the scope of the present disclosure to process 304 the plurality of IO features.

In some implementations, the machine learning model may be used for regression. For example, ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for processing the one or more IO features within the scope of the present disclosure.

In some implementations, processing 306 the plurality of sampled IO requests using a machine learning model may include generating 316 a plurality of IO features using the plurality of sampled IO requests. An IO feature is a representation of a plurality of IO properties associated with a particular storage object over a period of time. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; a percentage of consecutive IO requests that are both read IO requests; a percentage of IO requests with a read IO request followed by a write IO request; a percentage of consecutive IO requests that are both write IO requests; a percentage of consecutive read IO requests that are followed by a write IO request that overwrites the previously read address range; a percentage of IO requests in a predefined sequence size that include a read IO request followed by a write IO request within the predefined sequence size; an average entropy of the address range that was written; and an average change in entropy of the address range that was written; etc.

In some implementations, IO stream sampling process 10 generates 316 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of sampled IO requests. In this manner, IO stream sampling process 10 may extract various IO properties associated with the plurality of IO requests. As will be discussed in greater detail below, the IO properties may include variables associated with the temperature of a storage object (i.e., a likelihood that data may be read from a storage object and/or that data may be written to a storage object within a particular time frame). Referring again to FIG. 4 and in some implementations, IO stream sampling process 10 may extract one or more IO properties from plurality of IO requests 400. For example, IO stream sampling process 10 may extract IO properties 410 from IO request 402; IO properties 412 from IO request 404; IO properties 414 from IO request 406; and IO properties 416 from IO request 408. From IO properties 410, 412, 414, and 416, IO stream sampling process 10 may generate 316 a plurality of IO features (e.g., IO features 418, 420, 422, 424).

In some implementations, IO stream sampling process 10 may forecast a temperature value for the storage object using the machine learning model and the plurality of sampled IO requests. Forecasting a temperature of a storage object may include generating a temperature value indicative of a likelihood that a storage object will be accessed within a particular time frame. The temperature may incorporate the number of IO requests performed against the storage object, as well as the number of bytes transferred, within the relevant time frame. For example, the temperature value may include a read temperature, a write temperature, and/or a combination of a read and write temperature. That is, a temperature value may indicate a likelihood that data may be read from a storage object and/or that data may be written to a storage object within a particular time frame. In some implementations, the temperature value may be utilized by various tiering or caching policies to optimize the tiering or caching of the storage objects within the storage system. For example, the temperature prediction may enable various tiering or caching policies that use the predicted temperature, along with other values such as the system parameters (e.g., the tiering hierarchy topology, sizes of various layers, etc.), to optimize (up or down) tiering or caching decisions, resulting in a performance gain.

In some implementations, IO stream sampling process 10 may process, using the machine learning model, the plurality of IO features (e.g., IO features 418, 420, 422, 424) to define a temperature value (e.g., temperature 428) for one or more storage objects of the storage system. For example, the machine learning model may forecast or predict a temperature value of each storage extent, which may be correlated with storage system performance gain if a tiering operation to a particular tier (e.g., up-tiering/promotion to highest tier or down-tiering/demotion to lowest tier) is applied to that storage extent. In this manner, the temperature value may be an indication of a temperature associated with the storage object. For example, if a storage object is accessed more frequently, IO requests for that storage object will be most efficiently processed using a higher performance storage tier. By contrast, if a storage object is accessed infrequently, IO requests for that storage object may be efficiently processed using a lower performance storage tier. As such, it will be appreciated that IO stream sampling process 10 may use the forecasted temperature value from sampled IO responses to perform various operations (i.e., tiering, caching, ransomware detection, etc.) to enhance the performance and/or security of a storage system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
processing a plurality of input/output (IO) requests for a storage object of a storage system;
determining a sampling interval for the plurality of IO requests for the storage object based upon, at least in part, a machine learning model processing the plurality of IO requests, wherein determining the sampling interval includes:

comparing IO feature similarity from a first sampling interval and at least a second sampling interval by determining an IO feature signature for the first sampling interval and an IO feature signature for the at least a second sampling interval; and identifying a sampling interval with the most similar IO feature signature from the first sampling interval and the IO feature signature of the at least a second sampling interval;

sampling the plurality of IO requests using the determined sampling interval; and processing the plurality of sampled IO requests using the machine learning model.

2. The computer-implemented method of claim 1, wherein the sampling interval includes a sampling interval duration.

3. The computer-implemented method of claim 1, wherein the sampling interval includes a sampling interval frequency.

4. The computer-implemented method of claim 1, wherein determining the sampling interval includes:
   determining a plurality of target IO features associated with the machine learning model; and
   determining a sampling interval associated with the plurality of target IO features.

5. The computer-implemented method of claim 1, wherein determining the sampling interval includes comparing machine learning model performance between a first sampling interval and at least a second sampling interval.

6. The computer-implemented method of claim 1, wherein processing the plurality of sampled IO requests using a machine learning model includes generating a plurality of IO features using the plurality of sampled IO requests.

7. The computer-implemented method of claim 6, wherein the plurality of IO features include one or more of:
   a number of IO requests per second (IOPS);
   a total number of read IO requests;
   a total number of write IO requests;
   a percentage of sequential read IO requests;
   a percentage of sequential write IO requests;
   an average length of read IO requests;
   an average length of write IO requests;
   a standard deviation in read IO request length; and
   a standard deviation in write IO request length.

8. A computer program product residing on a non-transitory computer readable medium having a plurality of instructions stored thereon which, when executed by a processor, cause the processor to perform operations comprising:
   processing a plurality of input/output (IO) requests for a storage object of a storage system;
   determining a sampling interval for the plurality of IO requests for the storage object based upon, at least in part, a machine learning model processing the plurality of IO requests, wherein determining the sampling interval includes:
      comparing IO feature similarity from a first sampling interval and at least a second sampling interval by determining an IO feature signature for the first sampling interval and an IO feature signature for the at least a second sampling interval; and
      identifying a sampling interval with the most similar IO feature signature from the first sampling interval and the IO feature signature of the at least a second sampling interval;
   sampling the plurality of IO requests using the determined sampling interval; and
   processing the plurality of sampled IO requests using the machine learning model.

9. The computer program product of claim 8, wherein the sampling interval includes a sampling interval duration.

10. The computer program product of claim 8, wherein the sampling interval includes a sampling interval frequency.

11. The computer program product of claim 8, wherein determining the sampling interval includes:
   determining a plurality of target IO features associated with the machine learning model; and
   determining a sampling interval associated with the plurality of target IO features.

12. The computer program product of claim 8, wherein determining the sampling interval includes comparing IO feature similarity from a first sampling interval and at least a second sampling interval.

13. The computer program product of claim 8, wherein processing the plurality of sampled IO requests using a machine learning model includes generating a plurality of IO features using the plurality of sampled IO requests.

14. The computer program product of claim 13, wherein the plurality of IO features include one or more of:
   a number of IO requests per second (IOPS);
   a total number of read IO requests;
   a total number of write IO requests;
   a percentage of sequential read IO requests;
   a percentage of sequential write IO requests;
   an average length of read IO requests;
   an average length of write IO requests;
   a standard deviation in read IO request length; and
   a standard deviation in write IO request length.

15. A computing system comprising:
   a memory; and
   a processor configured to process a plurality of input/output (IO) requests for a storage object of a storage system, wherein the processor is further configured to determine a sampling interval for the plurality of IO requests for the storage object based upon, at least in part, a machine learning model processing the plurality of IO requests, wherein determining the sampling interval includes: comparing IO feature similarity from a first sampling interval and at least a second sampling interval by determining an IO feature signature for the first sampling interval and an IO feature signature for the at least a second sampling interval, and identifying a sampling interval with the most similar IO feature signature from the first sampling interval and the IO feature signature of the at least a second sampling interval, wherein the processor is further configured to sample the plurality of IO requests using the determined sampling interval, and wherein the processor is further configured to process the plurality of sampled IO requests using the machine learning model.

16. The computing system of claim 15, wherein the sampling interval includes a sampling interval duration and a sampling interval frequency.

17. The computing system of claim 15, wherein determining the sampling interval includes:
   determining a plurality of target IO features associated with the machine learning model; and
   determining a sampling interval associated with the plurality of target IO features.

18. The computing system of claim 15, wherein determining the sampling interval includes comparing machine learning model performance between a first sampling interval and at least a second sampling interval.

* * * * *